(12) United States Patent
Kodama

(10) Patent No.: US 6,195,120 B1
(45) Date of Patent: Feb. 27, 2001

(54) FILM IMAGE READER WITH FUNCTION OF WRITING IMAGE ENTRY-TIME CONDITIONS ON MAGNETIC RECORDING SECTION FOR REUTILIZATION THEREOF

(75) Inventor: Shinichi Kodama, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/014,717

(22) Filed: Jan. 28, 1998

(30) Foreign Application Priority Data

Jan. 30, 1997 (JP) .................................................. 9-015797

(51) Int. Cl.⁷ ............................... H04N 5/253; H04N 9/47
(52) U.S. Cl. .............................................................. 348/96
(58) Field of Search ............................. 348/96–98, 102, 348/107, 110, 112, 195; 396/319; 386/124–126; 382/318, 320

(56) References Cited

U.S. PATENT DOCUMENTS

| | | | |
|---|---|---|---|
| 5,204,851 | * 4/1993 | Kawada et al. | 369/126 |
| 5,555,047 | * 9/1996 | Tsuji | 396/319 |
| 5,633,977 | * 5/1997 | Inoue et al. | 386/127 |
| 5,852,503 | * 12/1998 | Kawaoka | 358/527 |
| 5,883,729 | * 3/1999 | Miyazawa | 358/506 |
| 5,895,135 | * 4/1999 | Funaki | 396/319 |

FOREIGN PATENT DOCUMENTS

| | | |
|---|---|---|
| 6-98092 | 4/1994 | (JP) . |
| 7-240839 | 9/1995 | (JP) . |

* cited by examiner

*Primary Examiner*—Vu Le
(74) *Attorney, Agent, or Firm*—Frishauf, Holtz, Goodman, Langer & Chick, P.C.

(57) ABSTRACT

An image reader uses a film having a magnetic information recording section. An image entry section reads a photographic image captured on a film and digitizes it. A setting section sets at least one imaging condition selected from the integration time, gradation conversion characteristic, and resolution of the image entry section as control information. A magnetic writing section writes the control information set by the setting section onto the magnetic information recording section of the film. A magnetic reading section reads the control information from the magnetic information recording section. A control section is responsive to the control information read by the reading section to control the image entry section.

18 Claims, 4 Drawing Sheets

FILM IMAGE READER WITH FUNCTION OF WRITING IMAGE ENTRY-TIME CONDITIONS ON MAGNETIC RECORDING SECTION FOR REUTILIZATION THEREOF

BACKGROUND OF THE INVENTION

The present invention relates to an image reader and more specifically to an image reader for digitizing images recorded on photographic films.

As is well known, an image reader, such as a film scanner, is generally used to digitize images recorded on photographic films with high quality.

With a photographic film which, like IX240, has a magnetic recording section, film images can be digitized easily by the use of shooting information recorded on the magnetic recording section of the film at the time of shooting, such as trimming information, image size information, light source information, etc., as disclosed in Jpn. Pat. Appln. KOKAI Publication No. 6-98092.

In general, a solid-state imaging device, such as a CCD, is used to read in images recorded on photographic films.

Thus, in many cases, the range of gradation of read images is narrower than that of on-film images; mere information recorded at the time of shooting is not enough to provide satisfactory digitized images.

In order to provide digitized images as users desire, it is required to change the integration time (charge storage time) or the gradation conversion characteristic (characteristic of output relative to input) of the solid-state imaging device each time an image is read and digitized.

In particular, it is almost impossible to digitize an image again under the same conditions as when it was digitized.

Similarly, same can be said with respect to information such as trimming information set by a user.

BRIEF SUMMARY OF THE INVENTION

It is an object of the present invention to provide an image reader which permits images recorded on a photographic film to be digitized at all times as a user desires and which thereby permits an on-film image which was digitized once to be digitized again under the same conditions.

According to a first aspect of the present invention, there is provided an image reader for use with a film having a magnetic information recording section comprising: image entry means for reading a photographic image recorded on the film and converting it into a digitized image; setting means for setting information used to control the image entry means; and magnetic writing means for writing the information set by the setting means onto the magnetic information recording section of the film.

According to a second aspect of the present invention there is provided an image reader for use with a film having a magnetic information recording section comprising: image entry means for reading a photographic image recorded on the film and converting it into a digitized image; setting means for setting information used to control the image entry means; magnetic writing means for writing the information set by the setting means onto the magnetic information recording section of the film; magnetic reading means for reading the information written by the magnetic writing means from the magnetic information recording section of the film; and imaging control means responsive to the information read by the magnetic reading means for controlling the image entry means.

According to a third aspect of the present invention there is provided an image reader for use with a film having a magnetic information recording section comprising: image entry means for reading a photographic image recorded on the film and converting it into a digitized image; reading condition setting means for setting conditions concerning a trimming area of the image recorded on the film and a resolution at which the image is read imaging condition setting means for setting at least one of an integration time and a gradation conversion characteristic of the image entry means as an imaging condition; magnetic writing means for writing information concerning the conditions set by the reading condition setting means and the imaging condition setting means onto the magnetic information recording section of the film; magnetic reading means for reading the information written by the magnetic writing means from the magnetic information recording section of the film; and imaging control means responsive to the information read by the magnetic reading means for controlling the image entry means.

According to a fourth aspect of the present invention there is provided an image reader comprising: image entry means for reading a photographic image on a developed film and converting it into a digitized image; setting means for setting information for controlling the image entry means; and writing means for writing the information set by the setting means onto an area of the film other than an area where the photographic image is recorded.

In the image reader of the first aspect, the user sets through the setting unit image reading conditions in reading and digitizing a photographic image on a film by means of the image entry means and the magnetic writing means records information concerning the reading conditions, such the integration time, gradation conversion characteristic, resolution, trimming range, etc., on the magnetic recording section of the film.

In the image reader of the second aspect, the user sets through the setting unit image reading conditions in reading and digitizing a photographic image on a film by means of the image entry means and the magnetic writing means records information concerning the reading conditions, such the integration time, gradation conversion characteristic, resolution, trimming range, etc., on the magnetic recording section of the film.

When the image is read and digitized again, the magnetic reading means reads the information recorded on the magnetic recording section of the film and the imaging control means controls the image entry means according to the read information.

In the image reader of the third aspect, the imaging control means controls the image entry means to digitize a film image in accordance with the image reading conditions set by the user, such as the integration time, gradation conversion characteristic, resolution, trimming range and the magnetic writing means records the image reading conditions on the magnetic recording section of the film.

When the image is read and digitized again, the magnetic reading means reads the information recorded on the magnetic recording section of the film and the imaging control means controls the image entry means according to the read information.

In the image reader of the fourth aspect, the user sets through the setting unit image reading conditions in reading and digitizing a photographic image on a film by means of the image entry means and the magnetic writing means records information concerning the image reading conditions, such the integration time, gradation conversion characteristic, resolution, trimming range, etc., on the magnetic recording section of the film.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
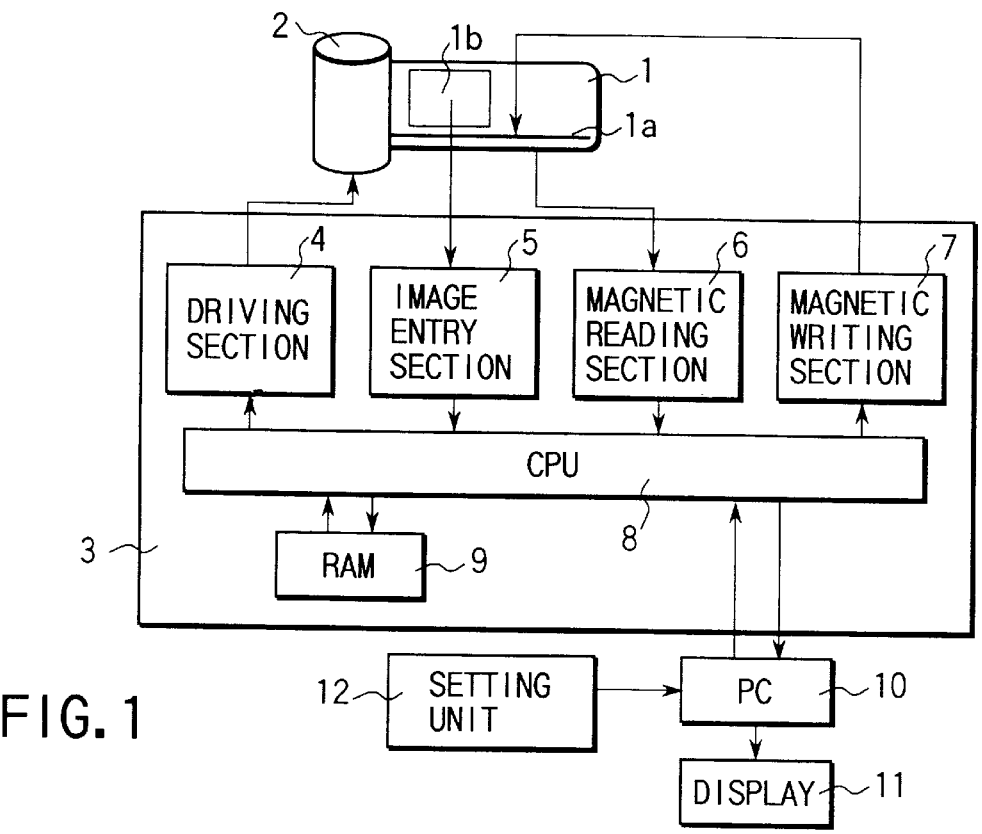
FIG. 1 is a schematic representation of an image reader according to an embodiment of the present invention.

Reference will now be made in detail to the presently preferred embodiments of the invention as illustrated in the accompanying drawings, in which like reference characters designate like or corresponding parts throughout the several drawings.

Referring to FIG. 1, there is illustrated in block diagram form an image reader according to an embodiment of the present invention.

This embodiment is directed to an image reader which uses, as a photographic film, such an IX240 film as has a magnetic recording section.

That is, according to this image reader, conditions set in reading and digitizing a photographic image recorded on a developed film are recorded onto its magnetic recording section (this is made open to users) and the recorded information is employed when that image is captured again.

As shown in FIG. 1, a film 1 already developed is normally left in a film cartridge 2.

This film 1 is formed with a magnetic recording section 1*a*.

The image reader 3 comprises a driving section 4 for fast-forwarding, frame-by-frame forwarding, or fast-rewinding the film 1, an image entry section 5 for reading in a recorded image 1*b* on the film as a digitized image, a magnetic reading section 6 for reading image reading conditions recorded on the magnetic recording section 1*a* of the film 1, a magnetic writing section 7 for recording the image reading conditions onto the magnetic recording section 1*a* of the film, a central processing unit (hereinafter referred to as the CPU) 8 controlling these sections 3, 4, 6, and 7 and connected with an external personal computer (hereinafter referred to as the PC) for communication therebetween, and a readable/writable memory (hereinafter referred to as the RAM) 9 connected with the CPU 8.

In particular, the image entry section 5 is composed of a two-dimensional CCD with a large number of picture elements (for example, one million picture elements or more), amplifiers, A/D converters with variable gamma characteristic, and so on.

The gamma characteristic-variable A/D circuit has its characteristic controlled by an external signal. An example of such an A/D converter is disclosed in Jpn. Pat. Appln. KOKAI Publication No. 7-240839.

The image reader 3 is further connected to the PC 10.

With the PC 10 are connected a display unit 11 which displays image information and magnetic information read from the film 1 by the image reader 3 and a setting unit 12 which sets commands to the CPU 8 through the PC 10.

The setting unit 12 corresponds to a mouse or keyboard.

The recorded image 1*b* on the film 1 is first fed through the image entry section 5 and the CPU 8 into the RAM 9, then sent to the PC 10 through the CPU 8 and displayed on the display unit 11.

The user sets a resolution, a trimming area, an integration time, a gradation characteristic, etc., with the setting unit 12 while watching image information displayed on the display unit 11.

The display image is digitally corrected by the PC 10 according to the set conditions. If the corrected display image meets the user's requirements, then the image is read again under the newly set conditions.

The image reading conditions, such as the resolution, trimming area, integration time, and graduation characteristic, are recorded on the magnetic recording section 1*a* of the film 1 by means of the magnetic writing section 7.

To read the same image next time, the information already recorded on the magnetic recording section 1*a* of the film 1 is read first by the magnetic reading section 6 into the CPU 8 and then the image is read by the image entry section 5 under the same conditions as when the conditions was set and displayed on the display unit 11.

Next, the operation of the image reader 3 will be described with reference to a flowchart of FIG. 2.

In step (indicated by "#" in FIG. 2) 1, the CPU 8 makes a decision of whether or not a Terminate command to terminate the operation of the image reader 3 has been input from the PC 10.

If the Terminate command has been input, then the CPU 8 goes to step 2 to bring the procedure to an end.

If, on the other hand, the decision in step 1 is that the Terminate command has not been input, then the CPU 8 goes to step 3 in which a decision is made as to whether or not a film cartridge has been loaded into the image reader body (not shown).

If the decision is that no film cartridge is loaded, the procedure returns to step 1.

If, on the other hand, the decision in step 3 is that a cartridge has been loaded, then the CPU 8 goes to step 4 to initialize the device (i.e., sets the resolution, trimming area as an imaging region of the film, integration time and gradation characteristic to their respective initial values).

Next, the CPU 8 goes to step 5, thereby driving the film driving section 4 to forward the film 1 from the film cartridge 2 and causing the magnetic reading section 6 to read information recorded on the magnetic recording section 1*a* of the film.

The CPU 8 then goes to step 6 in which the image entry section 5 is driven to make an indexed scan through recorded images 1b on the film and low-resolution images thus obtained are displayed on the display unit 11 through the PC 10.

In subsequent step 7, the CPU 8 makes a decision of whether some operation command has been entered from the setting unit 12 through the PC 10.

This operation command is selected by the user at the setting unit 12.

The operation command selected by the user is displayed on the display unit 11 via the PC 10.

An Indexed Scan command which is one of operation commands is one that causes the recorded images 1b on the film 1 to be read and displayed at such a resolution that the images can be recognized only roughly.

A One-Frame Scan command is an operation command that causes an image to be read and displayed at a resolution set by the user.

A Film Replace command is an operation command that causes the film 1 to be rewound and the film cartridge to be ejected from the image reader body so as to replace the presently loaded film cartridge with another.

The previously described Terminate command is an operation command that causes the film to be rewound in the cartridge and thereby terminate the operation of the image reader.

When, in step 7, it is decided that no operation command has been entered, the CPU 8 is placed in the wait state until a command is input.

On the other hand, when the decision in step 7 is that some operation command has been input, the CPU 8 makes a decision of whether or not the input operation command is the Indexed Scan command in step 8.

If the operation command is the Indexed Scan command, then the CPU 8 makes an indexed scan again in step 6.

If, on the other hand, the decision is that the operation command is not the Indexed Scan command, then the CPU makes a decision of whether or not the input operation command is the One-Frame Scan command in step 9.

When the input operation command is the One-Frame Scan command, the CPU goes to step 10.

In step 10, the CPU makes a decision of whether the number of a frame for which one-frame scan is to be made has been input. If it has not been, the CPU waits until the frame number is input.

When, in step 10, it is decided that the frame number has been input, the CPU goes to step 11 in which the driving section 4 transports the film 1 to the position in which the frame corresponding to the input frame number can be read, or scanned.

At the completion of the film transport, the CPU calls an image reading subroutine to be described later into execution in step 12 and then goes to step 13.

In step 13, the CPU makes a decision of whether or not a Preserve command indicating whether to preserve the image read in step 12 or not has been input.

When the Preserve command has not been input yet by the user, the CPU waits until that command is input.

When the decision is that the Preserve command has been input, the CPU makes a decision of whether or not the Preserve command indicates for the read image to be preserved.

If the decision is that the image is not to be preserved, the CPU goes to step 7.

If, on the other hand, the decision is that the image is to be preserved, the CPU goes to step 15 in which the image is preserved.

In step 15, the read image is saved on an external nonvolatile storage medium, such as a hard disk, a magneto-optical disk, or a floppy disk.

After the completion of the image preservation, the CPU goes to step 16.

In step 16, the CPU records image reading conditions (the resolution, trimming range, integration time, gradation characteristic) on the magnetic information recording section 1a of the film 1 using the magnetic write section 7 and then goes to step 7.

When the decision in step 9 is that no One-Frame Scan command has been input, the CPU goes to step 17 to make a decision of whether the Film Replace command has bee input or not.

When the decision in step 17 is that the Film Replace command has been input, the CPU causes the driving circuit 4 to rewind the film in step 21 and then goes to step 22.

In step 22, the CPU causes ejecting means not shown to eject the film cartridge 2 from the image reader body and then goes to step 2 to terminate the procedure.

Figure 3:
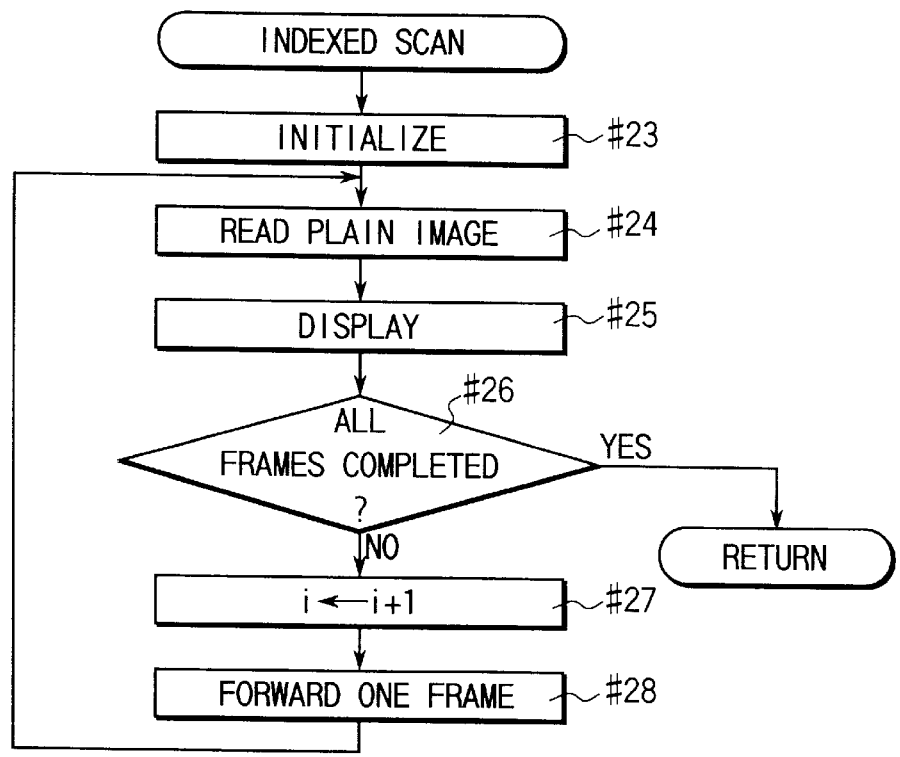
FIG. 3 is a flowchart illustrating the indexed scan subroutine of FIG. 2.

Next, the Indexed Scan subroutine in step 6 of FIG. 2 will be described with reference to a flowchart of FIG. 3.

Figure 2:
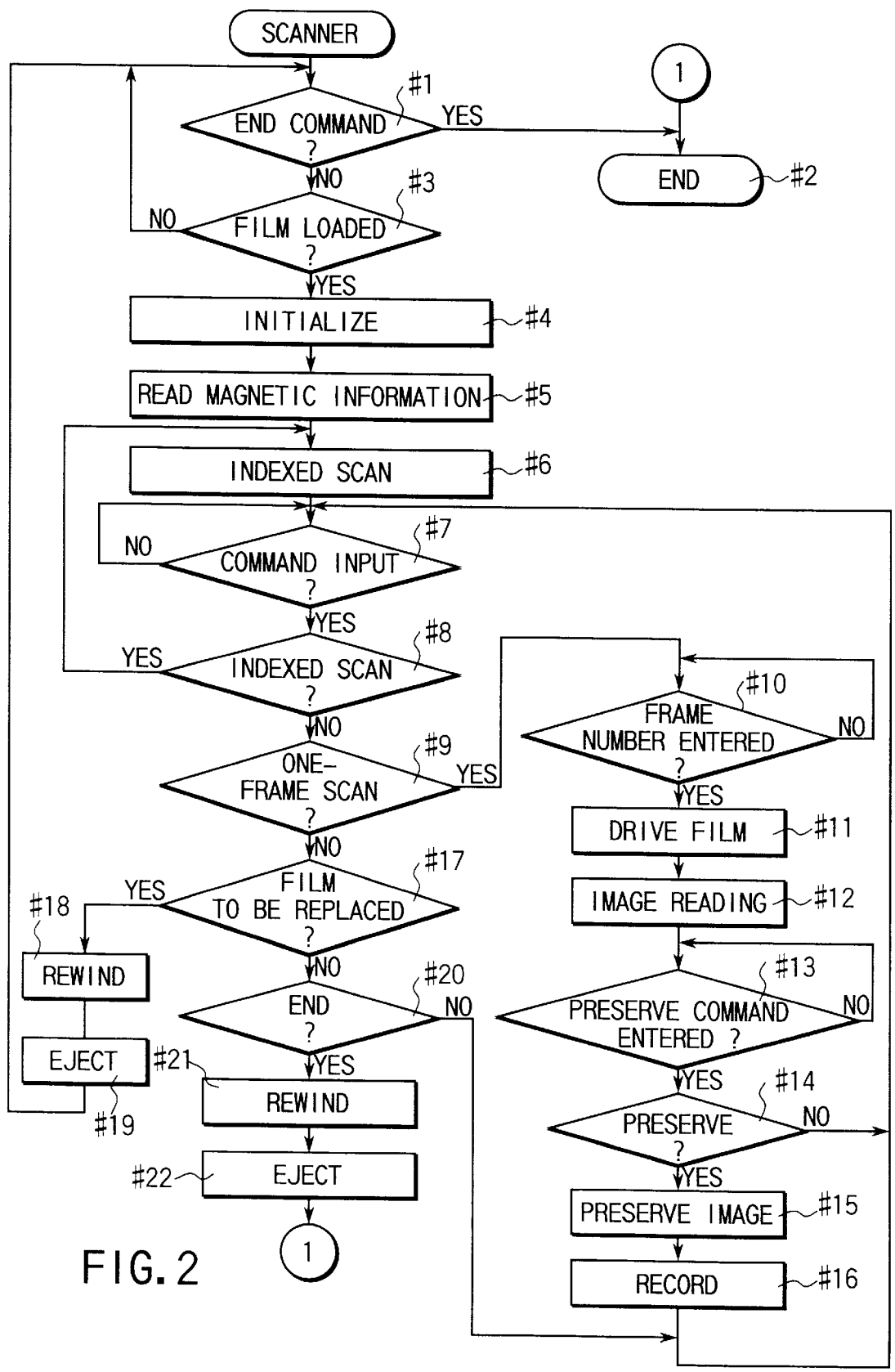
FIG. 2 is a flowchart for the operation of the image reader shown in FIG. 1.

When the CPU goes to step 6 in FIG. 2, the Indexed Scan subroutine is carried out.

First, in step 23, the CPU carries out initialization (initialization of film position; variable i=0).

Then, in step 24, the CPU causes the image entry section 5 to read a recorded image as an image with such a low resolution that it can be recognized only roughly (such an image with a low resolution is hereinafter referred to as a plain image).

Next, the CPU goes to step 25 in which the plain image obtained in step 24 is displayed on the display unit 11. If, in this case, other plain images have already been displayed, this new plain image is displayed simultaneously with them.

In subsequent step 26, the CPU makes a decision of whether all the frames of the film 1 have been read or not.

When the decision is that all the frames have been read, the CPU ends the subroutine and then goes to step 7 in FIG. 2.

When all the frames have not been read, the CPU increments the variable i by one in step 27 and then goes to step 28.

In step 28, the CPU advances the film 1 one frame and then goes to step 24.

Since the plain image is small in itself and produced with its details omitted, the read and display processing can be performed at high speed.

Figure 4:
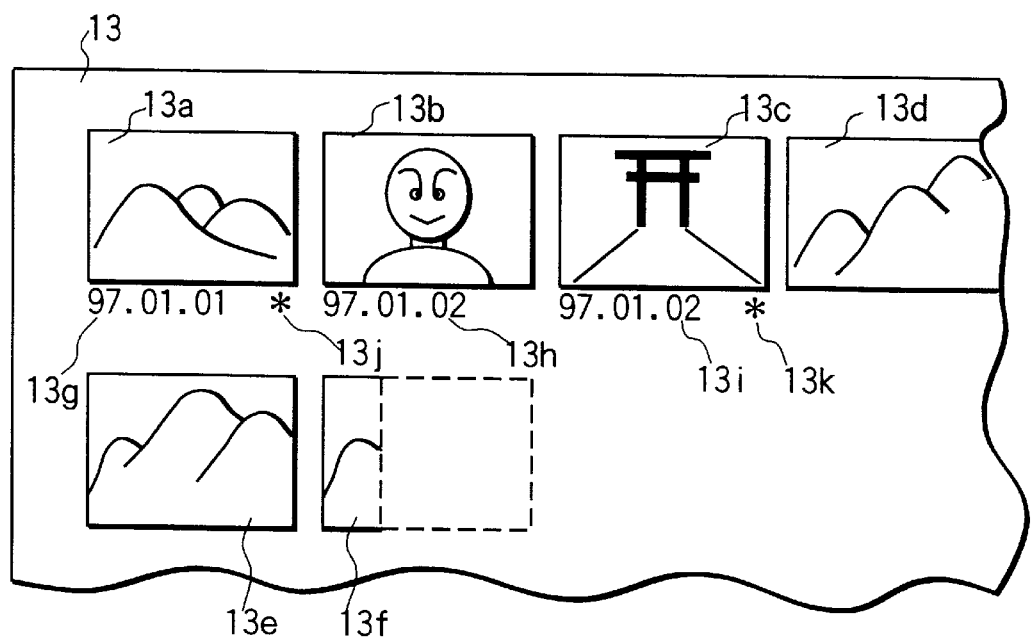
FIG. 4 shows images displayed on the display unit while the indexed scan subroutine is in execution.

In FIG. 4, there are illustrated images which are displayed on the display unit 11 throughout the execution of the Indexed Scan subroutine.

On the display unit 11, each of read images 13a through 13f is individually displayed in a small size on the display screen 11 so that many frames (for example, all the frames) can be watched at one time.

At the same time, information read from the magnetic recording section 1a of the film 1 is displayed under each individual image on the display unit 11.

For example, the IX240 film has dates of photography already imprinted and is further provided with a magnetic recording section the user is free to write in.

In FIG. 4, date information recorded by a camera and image information are displayed.

Dates 13*g*, 13*h* and 13*i* are displayed under the display images 13*a*, 13*b* and 13*c*, respectively.

Asterisks (*) 13*j* and 13*k* which are respectively displayed on the right-hand side of the date information 13*g* and 13*i* indicate that the corresponding image has been read before and information at that time has been recorded.

Instead of simply displaying asterisks, more detailed information and dates of reading may be displayed.

Figure 5:
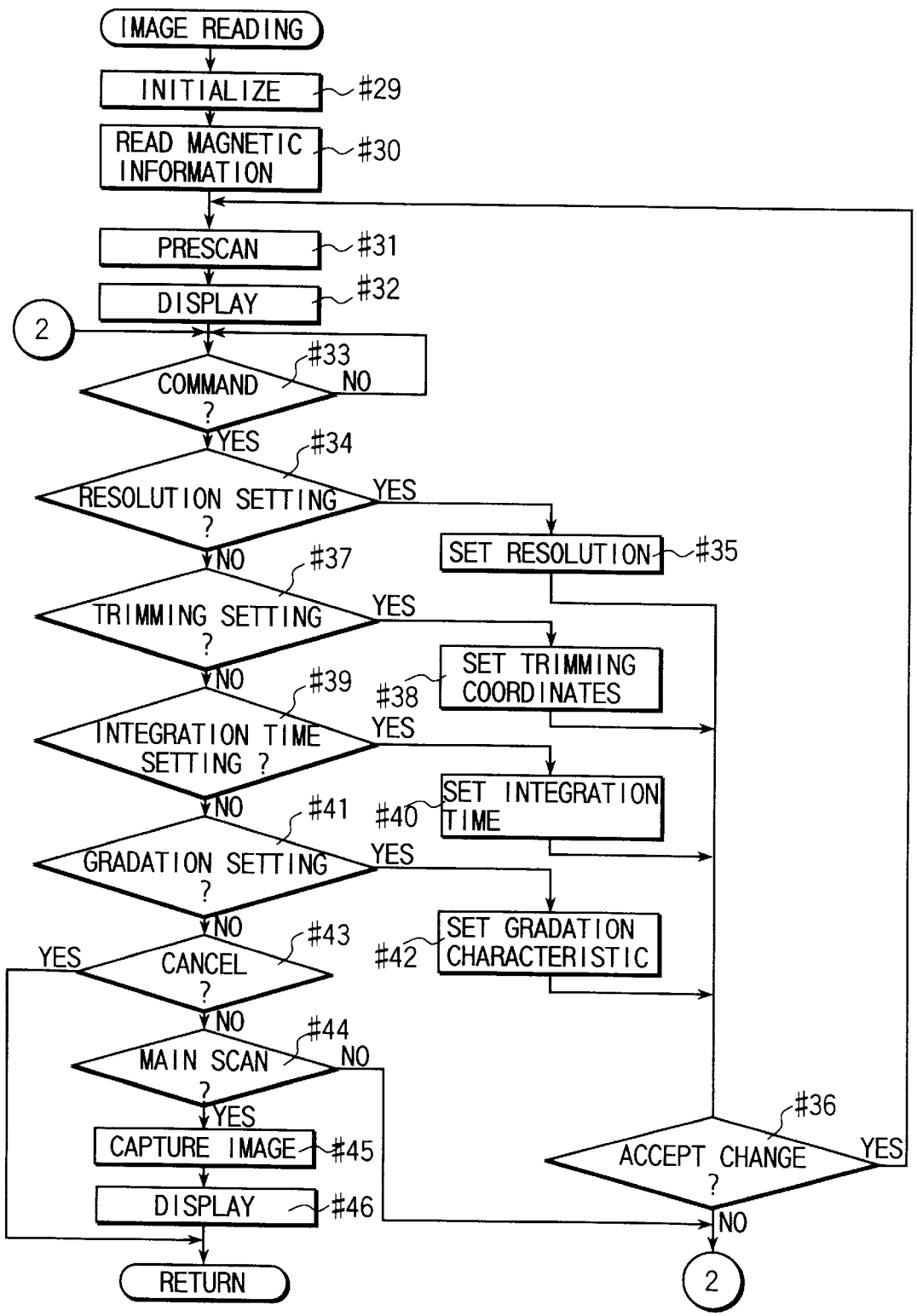
FIG. 5 is a flowchart illustrating the image reading subroutine of FIG. 2.

Next, reference will be made to FIG. 5 to describe the Image Reading subroutine in step 12 of FIG. 2.

When the procedure goes to step 12 of FIG. 2, the Image Reading subroutine is carried out.

First, in step 29, the CPU carries out initialization of the resolution, trimming range, integration time, and gradation characteristic.

Then, in step 30, the CPU reads recorded information from the magnetic recording section 1*a* of the film 1 again.

This reading step is carried out because an image for which magnetic information has been rewritten may be read again during the image reading procedure.

Then, in step 31, the CPU makes a prescan using the image entry section 5.

This prescan permits an image to be read with a larger number of picture elements and in a larger size than with the previously described plain images. Thus, the prescan-based image has such a resolution that its contents can be recognized almost sufficiently.

In resolution setting, a higher resolution than with prescan can be set.

In prescan, a trimming range can also be set.

At the same time the prescan-based image is displayed, therefore, magnetic information, i.e., image reading conditions, such as the resolution, trimming range, integration time, and gradation characteristic, and the date and time of photography imprinted on the film by the camera are displayed on the display unit 11.

Next, in step 33, the CPU makes a decision of whether an operation command has been entered or not.

This command is input by the user through the setting unit 12 as described previously.

Operation commands entered during the image reading subroutine mainly include a command for setting conditions for reading images.

Information concerning the reading conditions is displayed to the side of a prescan image already displayed on the display unit. The information can be rewritten by the user.

Figure 6:
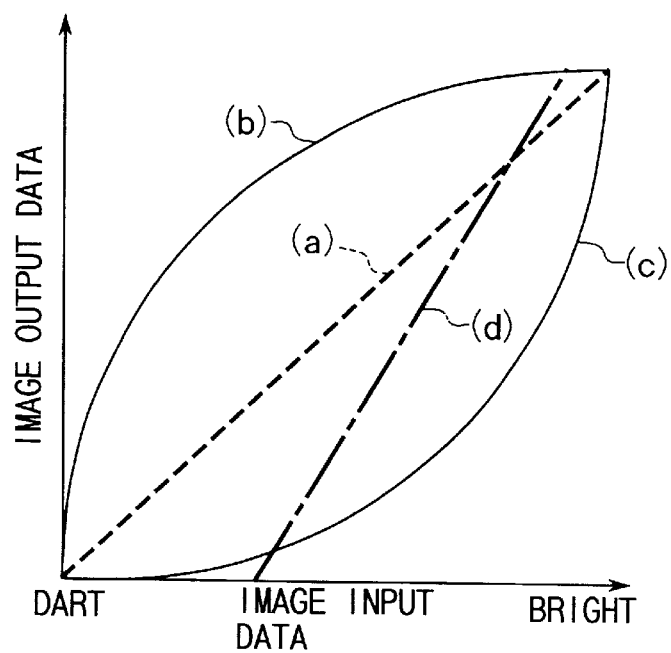
FIG. 6 shows examples of gradation characteristics of read images.

The information concerning the reading conditions includes resolution setting information for setting a resolution at which a recorded image on the film 1 is read in, trimming area indicating information for indicating that the read image is to be trimmed, trimming setting information for displaying a trimming frame on the prescan display image, integration time setting information for varying the integration time of the CCD with respect to a reference time, and gradation characteristic setting information for setting up a relationship between the gradation of the recorded image 1*b* on the film 1 and the gradation of the read digitized image which will be described later with reference to FIG. 6.

Other operation commands include a Cancel command for terminating the image reading subroutine without rewriting the information concerning the image reading conditions and a Scan command for executing the reading of a recorded image under set conditions.

If, in step 33, the decision is that no operation command has been entered by the user, the CPU 8 waits until an operation command is entered.

If, on the other hand, the decision is that an operation command has been entered, the procedure goes to steps starting with step 34 in order to change the image reading conditions.

In step 34, a decision is made as to whether or not the entered operation command is the resolution setting command to change the resolution setting information. If it is, the CPU goes to step 35 in which the resolution at which a recorded image is read is changed to one set by the user. The procedure then goes to step 36.

In step 36, the CPU prompts the user to accept or reject the change to the resolution.

If the user accepts the change, then he or she points to and clicks the Accept button on the display unit 11 through the setting unit 12.

If the user does not select the Accept button, then the CPU returns to step 33 to wait for entry of an operation command.

If, on the other hand, the user selects the Accept button, the CPU returns to step 31 to start a prescan.

If the decision in step 37 is that the resolution setting command has not been entered, then the CPU goes to step 37 in which a decision is made as to whether or not the trimming setting command has been entered.

If the decision is that the trimming setting command has been entered, the CPU goes to step 38 in which trimming coordinates are set.

The setting of trimming coordinates is performed by pointing to parts of the image displayed on the display unit 11 through the setting unit 12.

Upon termination of step 38, the CPU goes to step 36.

If the decision in step 37 is that the trimming command has not been entered, the CPU goes to step 39 in which a decision is made as to whether or not the integration time setting command has been entered.

If the decision is that the integration time setting command has been entered, the CPU goes to step 40.

In step 40, the CPU sets the integration time of the two-dimensional CCD provided in the image entry section 5 and then goes to step 36.

If the decision in step 39 is that the integration time setting command has been entered, the CPU goes to step 41.

In step 41, a decision is made as to whether or not the gradation characteristic setting command has been entered.

If it is, the CPU goes to step 42 in which the gradation characteristic of the read image is changed.

The gradation characteristic is changed by displaying such a graph as shown in FIG. 6 on the display unit 11 and changing or moving the curve through the setting unit 12.

After the gradation characteristic has been changed, the CPU goes to step 36.

If the decision in step 41 is that the gradation characteristic setting command has not been entered, the CPU goes to step 43.

In step 43, a decision is made as to whether or not the Cancel command has been entered. If it is, the CPU terminates this subroutine and returns to the main routine of FIG. 2.

If the Cancel command has not been entered, the CPU goes to step 44.

In step 44, a decision is made as to whether or not the Scan command has been entered.

If the Scan command has not been entered, the CPU goes to step 33 to wait for an operation command.

If the decision in step 44 is that the Scan command has been entered, the CPU goes to step 45 to execute image reading and then to step 46 to display the image read in step 45 on the display unit. After that, the procedure returns to the main routine of FIG. 2.

FIG. 6 shows examples of image gradation characteristics.

Information concerning gradation characteristics is recorded on the magnetic recording section 1a of the film 1 as magnetic data representing curves indicated at (a) to (d) in FIG. 6.

In FIG. 6, the curve (a) represents the default characteristic, the curve (b) the characteristic in which a portion in which the input light level is low is boosted, the curve (c) the characteristic in which a portion in which the input light level is high is boosted, and the curve (d) the characteristic in which a portion in which the input light level is low is limited.

These curves are displayed on the display unit 11 and can be set/changed by the user through the setting unit 12.

For example, the user can point to two or more points to approximate a curve. This curve is recorded in digital form on the magnetic recording section.

The actual change to the gradation characteristic can be made by changing the characteristic of the A/D converter in the image entry section 5 and performing digital signal processing.

As described above, by recording conditions when a film image was captured as a digitized image, such as the integration time, gradation characteristic, resolution, and trimming area, on the film, the image can be captured again under the same conditions as when it was captured the last time using the recorded information.

In this case, by recording the image reading conditions on the magnetic recording section 1a of the film 1, read image information can be stored without using a large capacity storage.

The present embodiment was described as using a two-dimensional CCD as the imaging device in the image entry section. Alternatively, a linear CCD may be used which will result in a smaller and more inexpensive image reader.

In this case, depending on a way for color separation, one liner CCD or two or more linear CCDs may be used.

Furthermore, it is recommended that a plurality of reading conditions be set and recorded together with date in such a way that they can be distinguished from one another.

Moreover, it is recommended that the user be able to select one of the set conditions so that its results can be confirmed on a prescan image.

To increase efficiency, it is recommended that the scanner perform the magnetic reading in synchronism with film driving.

In addition, the gradation characteristic may be changed by software (i.e., digital signal processing), not by hardware as in the embodiment described above in which case the characteristic of the A/D converter is changed.

Further, it is recommended that each of characteristics that form R, G and B colors be set and recorded on film independently.

When a function of image processing software (retouch software) is installed, the contents of image processing, such as color balance correction, contrast emphasis, edge emphasis, etc., may be recorded on film.

According to the present invention, as described above in detail, the following arrangements can be obtained:

(1) An image reader for use with a film having a magnetic information recording section comprising: image entry means for reading a photographic image recorded on the film and converting it into a digitized image; setting means for setting information used to control the image entry means; and magnetic writing means for writing the information set by the setting means onto the magnetic information recording section of the film.

(2) An image reader for use with a film having a magnetic information recording section comprising: image entry means for reading a photographic image recorded on the film and converting it into a digitized image; setting means for setting information used to control the image entry means; magnetic writing means for writing the information set by the setting means onto the magnetic information recording section of the film; magnetic reading means for reading the information written by the magnetic writing means from the magnetic information recording section of the film; and imaging control means responsive to the information read by the magnetic reading means for controlling the image entry means.

(3) An image reader for use with a film having a magnetic information recording section comprising: image entry means for reading a photographic image recorded on the film and converting it into a digitized image; reading condition setting means for setting conditions concerning a trimming area of the image recorded on the film and a resolution at which the image is read imaging condition setting means for setting at least one of an integration time and a gradation conversion characteristic of the image entry means as an imaging condition; magnetic writing means for writing information concerning the conditions set by the reading condition setting means and the imaging condition setting means onto the magnetic information recording section of the film; magnetic reading means for reading the information written by the magnetic writing means from the magnetic information recording section of the film; and imaging control means responsive to the information read by the magnetic reading means for controlling the image entry means.

(4) An image reader comprising: image entry means for reading a photographic image on a developed film and converting it into a digitized image; setting means for setting information for controlling the image entry means; and writing means for writing the information set by the setting means onto an area of the film other than an area where the photographic image is recorded.

(5) An image reader described in any one of (1), (2) and (4) wherein the setting means sets at least one of an integration time, a gradation conversion characteristic and a resolution of the image entry means as an imaging condition.

As described in the embodiment, by recording conditions under which a photographic image recorded on a film is read and digitized onto the film, the image can be read and digitized again under the same conditions as when its was read and digitized the last time.

In more detail, the image reader according to the first aspect of the present invention records information concerning conditions under which a photographic image on a film is read and digitized onto a magnetic information recording section of the film. Thus, the information can be utilized later to reproduce the same picture quality as when the photographic image was first read and digitized and to display the image reading conditions for confirmation.

In the image reader according to the second aspect of the present invention, information concerning conditions under which a photographic image on a film is read and digitized is recorded on a magnetic information recording section of the film. When the photographic image is read again, the information can be utilized to reproduce the same picture quality as when the image was read and digitized the last time.

In the image reader according to the third aspect of the present invention, information concerning conditions under which a photographic image on a film is read and digitized is set by user at the imaging condition setting section and the reading condition section and the reading conditions are recorded on a magnetic information recording section of the film. The information can be utilized to reproduce the same picture quality as when the photographic image was read and digitized the last time.

In the image reader according to the fourth aspect of the present invention, information concerning conditions under which a photographic image on a film is read and digitized is recorded onto a portion of the film other than the portion where the image is formed. The information can be utilized to reproduce the same picture quality as when the photographic image was read and digitized the last time and display the image reading conditions for confirmation.

Further, all the image readers described above have a feature that there is no necessity of a large capacity memory because a photographic image can be read and digitized as it is left on the film.

According to the present invention, therefore, there is provided an image reader which, by allowing the user to read and digitize an image recorded on a photographic film as he or she desires, can read and digitize that image again under the same conditions as when the image was read and digitized the last time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An image reader for use with a film having a magnetic information recording section, comprising:
   image entry means for reading a photographic image recorded on the film and converting the photographic image into a digitized image;
   setting means for setting information used to control the image entry means; and
   magnetic writing means for writing the information set by the setting means onto the magnetic information recording section of the film;
   wherein the information set by the setting means includes at least one of an integration time, a gradation conversion characteristic and a resolution of the image entry means as an imaging condition.

2. An image reader according to claim 1, wherein the magnetic writing means also writes onto the magnetic information recording section of the film a predetermined mark showing a data correction at a same time of writing the information set by the setting means.

3. An image reader for use with a film having a magnetic information recording section, comprising:
   image entry means for reading a photographic image recorded on the film and converting the photographic image into a digitized image;
   setting means for setting information used to control the image entry means;
   magnetic writing means for writing the information set by the setting means onto the magnetic information recording section of the film;
   magnetic reading means for reading the information written by the magnetic writing means from the magnetic information recording section of the film; and
   imaging control means responsive to the information read by the magnetic reading means for controlling the image entry means;
   wherein the information set by the setting means includes at least one of an integration time, a gradation conversion characteristic and a resolution of the image entry means as an imaging condition.

4. An image reader according to claim 3, wherein the magnetic writing means also writes onto the magnetic information recording section of the film a predetermined mark showing a data correction at a same time of writing the information set by the setting means.

5. An image reader for use with a film having a magnetic information recording section, comprising:
   image entry means for reading a photographic image recorded on the film and converting the photographic image into a digitized image;
   reading condition setting means for setting conditions concerning a trimming area of the image recorded on the film and a resolution at which the image is read;
   imaging condition setting means for setting at least one of an integration time and a gradation conversion characteristic of the image entry means as an imaging condition;
   magnetic writing means for writing information concerning the conditions set by the reading condition setting means and the imaging condition setting means onto the magnetic information recording section of the film;
   magnetic reading means for reading the information written by the magnetic writing means from the magnetic information recording section of the film; and
   imaging control means responsive to the information read by the magnetic reading means for controlling the image entry means.

6. An image reader comprising:
   image entry means for reading a photographic image on a developed film and converting the photographic image into a digitized image;
   setting means for setting information for controlling the image entry means; and
   writing means for writing the information set by the setting means onto an area of the film other than an area where the photographic image is recorded;
   wherein the information set by the setting means includes at least one of an integration time, a gradation conversion characteristic and a resolution of the image entry means as an imaging condition.

7. An image reader according to claim 6, wherein the magnetic writing means also writes onto the magnetic information recording section of the film a predetermined mark showing a data correction at a same time of writing the information set by the setting means.

8. An image reader for use with a film having a magnetic information recording section, comprising:
- image entry means for reading a photographic image recorded on the film and converting the photographic image into a digitized image;
- imaging control means for setting information used to control the image entry means, and controlling the image entry means; and
- magnetic writing means for writing the information set by the imaging control means onto the magnetic information recording section of the film;
- wherein the information set by the imaging control means includes at least one of an integration time, a gradation conversion characteristic and a resolution of the image entry means.

9. An image reader according to claim 8, wherein the magnetic writing means also writes onto the magnetic information recording section of the film a predetermined mark showing a data correction at a same time of writing the information set by the imaging control means.

10. An image reader for use with a film having a magnetic information recording section, comprising:
- image entry means for reading a photographic image recorded on the film and converting the photographic image into a digitized image;
- magnetic writing means for writing information for controlling the image entry means onto the magnetic information recording section of the film;
- magnetic reading means for reading the information written by the magnetic writing means from the magnetic information recording section of the film; and
- imaging control means responsive to the information read by the magnetic reading means for controlling the image entry means;
- wherein the imaging control means sets and controls at least one of an integration time, a gradation conversion characteristic and a resolution of the image entry means.

11. An image reader according to claim 10, wherein the magnetic writing means also writes onto the magnetic information recording section of the film a predetermined mark showing a data correction at a same time of writing the information for controlling the image entry means.

12. An image reader for use with a film having a magnetic information recording section, comprising:
- image entry means for reading a photographic image recorded on the film and converting the photographic image into a digitized image;
- information setting means for setting conditions concerning a trimming area of the image recorded on the film and a resolution at which the image is read;
- imaging condition setting means for setting at least one of an integration time and a gradation conversion characteristic of the image entry means as an imaging condition;
- magnetic writing means for writing information concerning the conditions set by the information setting means and the imaging condition setting means onto the magnetic information recording section of the film;
- magnetic reading means for reading the information written by the magnetic writing means from the magnetic information recording section of the film; and
- imaging control means responsive to the information read by the magnetic reading means for controlling the image entry means.

13. An image reader comprising:
- image entry means for reading a photographic image on a developed film and converting the photographic image into a digitized image;
- imaging control means for setting information used to control the image entry means, and controlling the image entry means; and
- writing means for writing the information set by the imaging control means onto an area of the film other than an area where the photographic image is recorded;
- wherein the information set by the imaging control means includes at least one of an integration time, a gradation conversion characteristic and a resolution of the image entry means.

14. An image reader according to claim 13, wherein the magnetic writing means also writes onto the magnetic information recording section of the film a predetermined mark showing a data correction at a same time of writing the information set by the imaging control means.

15. An image reader for use with a film having a magnetic information recording section, comprising:
- image entry means for reading an image recorded on the film and converting the photographic image into a digitized image;
- condition setting means for setting a condition for reading the image to the image entry means; and
- magnetic writing means for writing the condition set by the condition setting means onto the magnetic information recording section of the film after reading the image by the image entry means;
- wherein the condition set by the condition setting means includes at least one of an integration time, a gradation conversion characteristic and a resolution of the image entry means and an imaging region of the film.

16. An image reader according to claim 15, wherein the magnetic writing means also writes onto the magnetic information recording section of the film a predetermined mark showing a data correction at a same time of writing the condition set by the condition setting means.

17. An image reader for use with a film having a magnetic information recording section, comprising:
- image entry means for reading a photographic image recorded on the film and converting the photographic image into a digitized image data;
- image processing means for performing a predetermined processing of the digitized image data read and converted by the image entry means;
- data storing means for storing the digitized image data processed by the image storing means; and
- magnetic writing means for writing a processing condition of the image processing means onto the magnetic information recording section of the film after storing the digitized image data by the data storing means;
- wherein the processing condition includes at least one of an integration time, a gradation conversion characteristic and a resolution of the image entry means and an imaging region of the film.

18. An image reader according to claim 17, wherein the magnetic writing means also writes onto the magnetic information recording section of the film a predetermined mark showing a data correction at a same time of writing the processing condition.

* * * * *